Patented Jan. 2, 1951

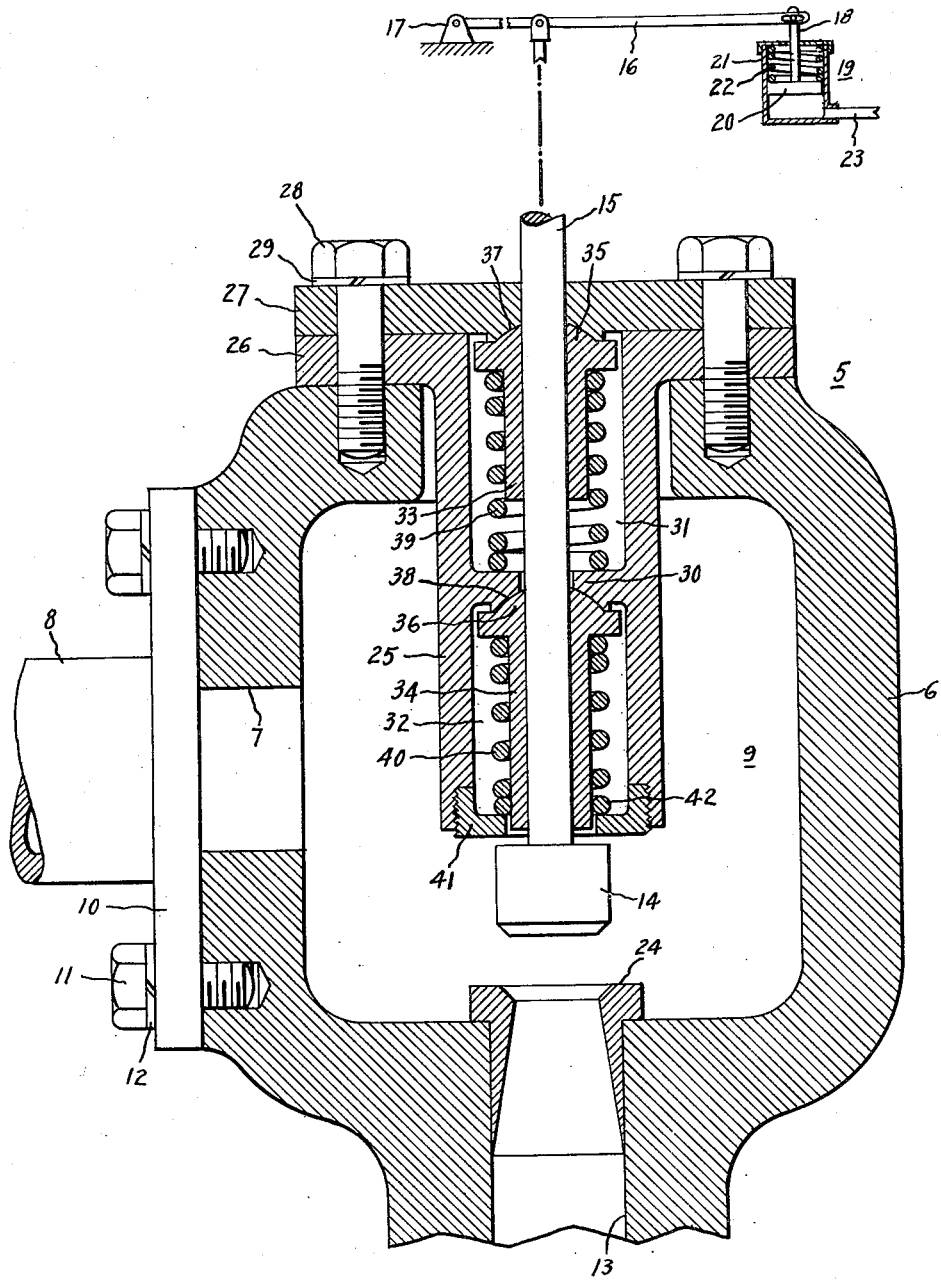

2,536,814

UNITED STATES PATENT OFFICE 2,536,814

PACKING FOR VALVE RODS

Paul H. Knowlton, Jr., Schenectady, N. Y., assignor to General Electric Company, a corporation of New York Application May 29, 1948, Serial No. 30,019

1 Claim. (Cl. 286—15)

The present invention relates to valves and more particularly to an improved structure for non-sticking fluid control valves.

Heretofore serious troubles have been experienced with valve-gear generally associated with an elastic fluid power plant, such as a steam turbine, due to mineral deposits from the boiler being carried over to the valves and collecting in the clearance spaces of the operating parts thereof. Over an extended period of time, these deposits may build up to such an extent that the valve-stem is caused to "freeze" or stick while in the open position. This is, of course, extremely serious when these valves are used as emergency stop valves, inlet control valves, etc., since without this protection a turbine may "run away" and be destroyed when an emergency condition occurs. A valve in accordance with the present invention has a non-sticking feature making the valve capable of being closed under any emergency or normal operating condition.

Accordingly, an object of my invention is to provide an improved non-sticking arrangement for fluid control valves, particularly adapted for applications in connection with elastic fluid power plants.

Other objects and advantages will be apparent from the following description taken in connection with the drawing in which the single figure represents a transverse sectional view of a valve having a non-sticking feature in accordance with my invention.

Referring now to the drawing, I have shown a valve 5 comprising a housing 6 defining an inlet port 7 through which steam or other operating fluid from a boiler (not shown) may be supplied by a conduit 8 to an inlet chamber 9. Formed integral with conduit 8 is a bolting flange 10 which is secured to housing 6 by suitable threaded fastenings 11 having lock washers 12 associated therewith. An outlet port 13 may communicate inlet chamber 9 with an outlet chamber (not shown) as in an emergency stop valve or with a first stage nozzle diaphragm (not shown) as in a turbine control valve.

A valve disk 14 is supported on the free end of a stem 15, the other end of which may be associated with suitable actuating means such as the hydraulic motor-lever arrangement shown in the drawing. With such an arrangement, stem 15 is pivotally connected to an intermediate point of an operating lever 16, one end of which pivots about a fulcrum 17 while the other end is pivotally connected to the upper end of a spindle 18 of hydraulic motor 19. The lower end of spindle 18 has affixed thereto a piston 20 which is slidably disposed within a cylinder defined by a casing 21 and biased downwardly by a spring 22. Movement of piston 20 is effected by pressure operating fluid, the flow of which through a conduit 23 both to and from the cylinder beneath piston 20, is controlled by a pilot valve (not shown). Thus, a fluid pressure increase beneath piston 20 will cause the piston to move upwardly against the action of biasing spring 22, thereby raising the right-hand end of lever 16 which in turn causes opening movement of stem 15. Conversely, a fluid pressure decrease in hydraulic motor 19 will cause stem 15 to move downwardly towards the closed position. When in the closed position, disk 14 is adapted to form a tight seal with a valve seat 24 which is secured by weld or other suitable means to housing 6 in outlet port 13.

Stem 15 is slidably arranged within a bushing assembly including an axially extending cylindrical housing 25 having a radially outward projecting bolting flange 26 which may be interposed between a valve head member 27 and valve housing 6 and secured thereto by threaded fastenings 28 and lock washers 29.

A radially inward projecting partition 30 divides the interior of bushing housing 25 into upper and lower chambers 31, 32 having respective axially extending bushing members 33, 34 which enclose stem 15 in freely slidable relation.

As shown in Fig. 1, bushings 33, 34 are provided with ball-faced heads 35, 36 which are adapted to engage convex recessed portions 37, 38 formed in head 27 and partition 30 respectively. Normally bushings 33, 34 are biased upwardly by coil springs 39, 40 so that the ball-faced heads 35, 36 seat in recessed portions 37, 38 and form seals therewith. At their upper ends, springs 39 and 40 are seated against the lower surfaces of the shoulders formed by heads 35, 36 while the respective lower ends thereof are seated against the upper surfaces of partition 30 and a collar member 41 which may be threaded in the lower end of bushing housing 18.

During normal operation of valve 5, stem 15 moves from the closed to open position and vice versa by sliding freely within bushings 33, 34. Assuming now, however, that mineral deposits from the boiler have built up between the bushings and stem 15 causing the stem to stick to the bushings while disk 14 is in the open position and assuming further than an emergency condition occurs which necessitates the immediate closing of the valve, bushings 33, 34 may unseat and move downwardly with stem 15 towards the closed position, since the upward biasing force of springs 39, 40 is proportioned so as to be considerably less than the downward force exerted by hydraulic motor 19 and lever 16 tending to close the valve.

In order to insure against any boiler deposit build-up which might cause sticking on the part of bushing 34, the central opening of collar 41 is proportioned to form a relatively large clearance space with the bushing. With the large clearance space thus formed, it is advisable to provide some form of sealing means between bushing 34 and collar 41 to prevent or minimize the passage of operating fluid to chambers 32 and 31 and thereby eliminate the possibility of any fouling due to boiler deposits forming therein. As illustrated in the present embodiment, coil spring 32 may conveniently seat at its lower end against an O ring 42, the latter of which serves as such a sealing means provided it binds bushing 26 rather tightly. The O ring seal thus formed between the bushing and collar 41 thereby effectively seals chambers 32 and 31 from inlet chamber 9.

While a particular embodiment of the invention has been illustrated and described, it will be obvious to those familiar with the art that various changes and modifications may be made without departing from the invention; and it is intended to cover in the appended claim all such changes and modifications as come within the true spirit and scope of the invention.

What I claim as new and desire to secure by Letters Patent of the United States is:

A supporting and sealing bushing assembly for a reciprocable rod subject to sticking in one position comprising a cylindrical wall portion surrounding the rod and spaced therefrom to define an annular chamber, a first radially extending wall at one end of the cylindrical wall and having a central opening forming a substantial clearance space with the rod, a second radially extending wall at the other end of the cylindrical wall and having a second central opening forming a large clearance space with the rod, a cylindrical bushing disposed in said chamber with a bore closely fitting the rod, said bushing having a first end portion freely projecting into said large clearance space, the first radial wall forming a spherical seat surrounding the central opening therein and disposed concave toward the bushing, said bushing having an enlarged second end portion defining a spherical end surface adapted to sealingly engage said seat, the enlarged end portion of the bushing also forming an annular shoulder at the side thereof opposite from the spherical surface, a sealing ring disposed around the first-mentioned end of the bushing and adapted to snugly seat against the bushing and abut the adjacent radial wall to seal the clearance space therebetween, and a coil spring disposed in the chamber around the bushing with one end thereof biasing the sealing ring into engagement with the radial wall and the other end engaging said annular shoulder to force the spherical end surface of the bushing into sealing engagement with said spherical seat, whereby, in the event the bushing sticks to the rod, the bushing is capable of moving axially through said sealing ring against the bias of the coil spring.

PAUL H. KNOWLTON, Jr.

REFERENCES CITED

The following references are of record in the file of this patent:

UNITED STATES PATENTS

| Number | Name | Date |
|---|---|---|
| 320,525 | Augustus | June 23, 1885 |
| 1,354,582 | Shimp | Oct. 5, 1920 |
| 1,632,418 | Ruegg | June 14, 1927 |
| 1,825,004 | Livergood | Sept. 29, 1931 |
| 2,061,874 | Johnson | Nov. 24, 1936 |
| 2,240,644 | Focat | May 6, 1941 |
| 2,266,365 | Harrison | Dec. 16, 1941 |